US011238706B2

(12) United States Patent
Kim

(10) Patent No.: US 11,238,706 B2
(45) Date of Patent: Feb. 1, 2022

(54) CRANE GAME MACHINE, CRANE GAME SYSTEM, AND CONTROL METHOD OF CRANE GAME MACHINE

(71) Applicant: Hyun Ki Kim, Changwon-si (KR)

(72) Inventor: Hyun Ki Kim, Changwon-si (KR)

( * ) Notice: Subject to any disclaimer, the term of this patent is extended or adjusted under 35 U.S.C. 154(b) by 39 days.

(21) Appl. No.: 16/781,779

(22) Filed: Feb. 4, 2020

(65) Prior Publication Data

US 2020/0175822 A1    Jun. 4, 2020

Related U.S. Application Data

(63) Continuation of application No. PCT/KR2018/008076, filed on Jul. 17, 2018.

(30) Foreign Application Priority Data

Aug. 16, 2017 (KR) .......................... 10-2017-0103376

(51) Int. Cl.
*G07F 17/32* (2006.01)

(52) U.S. Cl.
CPC ...... *G07F 17/3297* (2013.01); *G07F 17/3223* (2013.01); *G07F 17/3253* (2013.01)

(58) Field of Classification Search
CPC ............. G07F 17/3297; G07F 17/3223; G07F 17/3253; G07F 17/3244; G07F 17/34; A63F 9/30
USPC .................................................. 273/447, 448
See application file for complete search history.

(56) References Cited

U.S. PATENT DOCUMENTS

| 5,271,628 | A  | * | 12/1993 | Okada ....................... A63F 9/30 221/210 |
| 8,251,370 | B2 | * | 8/2012 | Guarnieri .................. A63F 9/30 273/448 |
| 9,186,574 | B2 | * | 11/2015 | Riggles ..................... A63F 9/30 |
| 9,192,853 | B2 | * | 11/2015 | Riggles ..................... A63F 9/30 |
| 9,802,116 | B2 | * | 10/2017 | Balaban ............. G07F 17/3223 |
| 9,818,265 | B1 | * | 11/2017 | Shoemaker, Jr. .. H04N 5/23206 |
| 10,055,943 | B2 | * | 8/2018 | Shoemaker, Jr. .......................... H04N 5/232939 |
| 10,249,148 | B2 | * | 4/2019 | Chu ..................... G07F 17/3223 |
| 10,741,014 | B2 | * | 8/2020 | Kramer ..................... A63F 9/30 |
| 10,818,152 | B2 | * | 10/2020 | Yeh ..................... G07F 17/3223 |
| 10,839,651 | B2 | * | 11/2020 | Smart ................. G07F 17/3209 |
| 2011/0115163 | A1 | * | 5/2011 | Guarnieri ............ G07F 17/3297 273/448 |
| 2012/0190417 | A1 | * | 7/2012 | Balaban .................... A63F 9/24 463/9 |
| 2012/0228828 | A1 | * | 9/2012 | Riggles ............... G07F 17/3251 273/447 |

(Continued)

*Primary Examiner* — Ronald Laneau
*Assistant Examiner* — Matthew D Hoel
(74) *Attorney, Agent, or Firm* — Studebaker & Brackett PC

(57) ABSTRACT

Disclosed is a crane game machine, which includes at least: a camera unit which images an inside of a main body in which prizes are accommodated, and generates an internal image; a prize moving unit which picks up a prize and then moves the prize to a first score point inside the main body; a sensor unit which is installed at the first score point and senses the passing of the prize through the first score point; a communication unit which transmits the internal image and the sensing result to an external device, and receives a prize moving unit control signal from the external device; and a control unit which controls the movement of the prize moving unit according to the prize moving unit control signal.

13 Claims, 13 Drawing Sheets

(56) References Cited

U.S. PATENT DOCUMENTS

| | | | | |
|---|---|---|---|---|
| 2013/0084934 A1* | 4/2013 | Young | G07F 17/3216 |
| | | | 463/16 |
| 2013/0231166 A1* | 9/2013 | Riggles | G07F 17/3297 |
| | | | 463/7 |
| 2015/0317871 A1* | 11/2015 | Graf | G07F 17/3202 |
| | | | 273/355 |
| 2016/0023097 A1* | 1/2016 | Balaban | G07F 17/3223 |
| | | | 273/447 |
| 2016/0082345 A1* | 3/2016 | Balaban | G07F 17/3227 |
| | | | 463/7 |
| 2018/0096559 A1* | 4/2018 | Balaban | G06Q 50/34 |
| 2018/0096565 A1* | 4/2018 | Shoemaker, Jr. | G07F 17/3248 |
| 2018/0137718 A1* | 5/2018 | Smart | G07F 17/3209 |
| 2018/0182206 A1* | 6/2018 | Kramer | G07F 17/3223 |
| 2018/0276954 A1* | 9/2018 | Chu | G07F 17/3223 |
| 2019/0221088 A1* | 7/2019 | Yeh | G07C 11/00 |
| 2020/0126366 A1* | 4/2020 | Smart | G07F 17/3216 |
| 2020/0175822 A1* | 6/2020 | Kim | A63F 9/30 |
| 2020/0349803 A1* | 11/2020 | Wronowski | G07F 17/3211 |
| 2021/0027587 A1* | 1/2021 | Yeh | G08B 7/06 |
| 2021/0074128 A1* | 3/2021 | Smart | G07F 17/3244 |

\* cited by examiner

CRANE GAME MACHINE, CRANE GAME SYSTEM, AND CONTROL METHOD OF CRANE GAME MACHINE

CROSS-REFERENCE TO RELATED APPLICATIONS

This application is a Continuation of International Application No. PCT/KR2018/008076 filed Jul. 17, 2018, which claims benefit of priority to Korean Patent Application No. 10-2017-0103376 filed Aug. 16, 2017, the entire content of which is incorporated herein by reference.

TECHNICAL FIELD

The present invention relates to a crane game machine, a crane game system, and a control method of a crane game machine, and more particularly, to a crane game machine, a crane game system, and a control method of a crane game machine, which allow a user to actually operate the crane game machine by using a user terminal through a network to play a game.

BACKGROUND ART

A claw machine game of operating a crane to take a prize has been very popular. The claw machine game refers to a game in which various prizes are placed in a housing so that a user may operate a crane through a joystick or a button to take out and carry a prize.

A crane game machine for playing such a claw machine game is limitedly installed in specific places. In order to enjoy the game, the user has to visit a place where the game machine is located in person. In addition, while the user is out, if the prize taken from the game machine is heavy, or there is no appropriate space to carry the prize, it is inconvenient to carry the prize around.

In order to solve the above problem, an online crane game system has been proposed. According to the related art, a user remotely controls a crane game machine by using a personal computer or a smartphone, and a taken-out prize is delivered to a home of the user.

According to the related art, when all prizes accommodated in the crane game machine are taken, the user may no longer play the game, so that it is inconvenient for an operator of the crane game machine to periodically check the crane game machine whether all the prizes have been taken and to periodically restock the crane game machine.

DISCLOSURE

Technical Problem

To solve the problems described above, an object of the present invention is to provide a crane game machine, a crane game system, and a control method of a crane game machine, which allows a game to be played through on-line without additionally restocking the crane game machine with prizes.

Technical Solution

To achieve the objects described above, according to the present invention, there is provided a crane game machine, a crane game system, and a control method of a crane game machine, which allows a game to be played through on-line without additionally restocking the crane game machine with prizes.

To achieve the objects described above, according to one embodiment of the present invention, there is provided a crane game machine including: a main body in which prizes are accommodated; a camera unit configured to capture an inside of the main body to generate an internal image; a prize moving unit provided at an upper portion of the main body, and configured to pick up the prize and move the prize to a first score point located inside the main body; a sensor unit installed at the first score point and configured to detect passing of the prize through the first score point; a communication unit configured to transmit the internal image and a detection result of the sensor unit to an external device, and receive a prize moving unit control signal from the external device; and a control unit configured to control a movement of the prize moving unit based on the prize moving unit control signal, and control the communication unit to transmit the internal image and the detection result of the sensor unit to the external device. Accordingly, since a user may access the crane game machine connected through a network to directly operate the crane game machine while watching an operation process without visiting the crane game machine in person, a convenience of the user may be improved, and a very realistic gaming experience may be obtained.

The crane game machine may further include a first prize passing part provided on the first score point and configured to allow the prize to pass therethrough, wherein the sensor unit may be configured to detect whether the prize passes through the first prize passing part.

The crane game machine may further include a second prize passing part provided on a second score point different from the first score point at a lower end of the main body and configured to allow the prize to pass therethrough, wherein the prize moving unit may move the prize to the first score point or the second score point based on a separate control signal, and the sensor unit may be configured to detect whether the prize passes through the first prize passing part or the second prize passing part.

The sensor unit may be configured to further detect at least one of a type, a shape, a size, and a color of the passing prize.

The prize moving unit may include: a crane unit configured to pick up and release the prize; and a moving unit configured to move the crane unit up, down, left, and right at the upper portion of the main body based on the prize moving unit control signal.

The camera unit may include a plurality of cameras configured to capture the inside of the main body from various angles.

The control unit may control the communication unit to transmit an image, which is captured by a camera selected among the cameras based on a camera unit control command received through the communication unit, to the external device as the internal image.

The crane game machine may further include a prize circulation unit configured to circulate the prizes accommodated in the main body.

The crane game machine of claim 8, wherein the prize circulation unit may be provided at a lower end of the main body, and may include a roller configured to stir the prizes.

To achieve the objects described above, according to one embodiment of the present invention, there is provided a crane game system including a plurality of crane game machines and a server, wherein each of the crane game machines includes: a main body in which prizes are accommodated; a camera unit configured to capture an inside of the main body to generate an internal image; a prize moving unit provided at an upper portion of the main body, and configured to pick up the prize and move the prize to a score point located inside the main body; a sensor unit installed at the score point and configured to detect passing of the prize through the score point; a first communication unit configured to transmit the internal image and a detection result of the sensor unit to an external device, and receive a prize moving unit control signal from the external device; and a first control unit configured to control a movement of the prize moving unit based on the prize moving unit control signal, and control the first communication unit to transmit the internal image and the detection result of the sensor unit to the external device, and the server includes: a second communication unit configured to transmit the prize moving unit control signal received from a user terminal to a first crane game machine selected by a user among the crane game machines, and transmit the internal image and token information of the user received from the first crane game machine to the user terminal; a token management unit configured to store the token information of the user; and a second control unit configured to store the token information of the user, which is generated based on the detection result of the sensor unit received from the first crane game machine, in the token management unit. Accordingly, since the user may access the crane game machine connected through a network to directly operate the crane game machine while watching an operation process without visiting the crane game machine in person, a convenience of the user may be improved, and a very realistic gaming experience may be obtained.

The crane game system may further include a prize passing part provided on the score point and configured to allow the prize to pass therethrough, wherein the sensor unit may be configured to detect whether the prize passes through the prize passing part.

The camera unit may include a plurality of cameras configured to capture an inside of each of the crane game machines from various angles, and the first control unit may control the first communication unit to transmit an image, which is captured by a camera selected among the cameras based on a camera unit control command received through the first communication unit, to the server as the internal image.

The control unit may transmit an occupancy state of each of the crane game machines according to an occupancy state identification request received from the user terminal.

The occupancy state may include at least one of information on whether each of the crane game machines is occupied by another user and information on a number of people waiting for each of the crane game machines.

The token information may include a first token generated when a first prize of the first crane game machine passes through a score point located inside a main body of the first crane game machine, and a second token generated when a second prize of a second crane game machine passes through a score point located inside a main body of the second crane game machine.

The first prize and the second prize may be different from each other in at least one of a size, a weight, a shape, and a color.

To achieve the objects described above, according to one embodiment of the present invention, there is provided a method of controlling a crane game machine, the method including: capturing an inside of a main body to generate an internal image; transmitting the generated internal image to an external device; receiving a prize moving unit control signal from the external device; picking up, by a prize moving unit, a prize accommodated in the main body and moving the prize to a score point based on the prize moving unit control signal; and detecting, by a sensor unit, whether the prize passes through the score point and transmitting a detection result to the external device.

Advantageous Effects

According to the present invention, since the user can access the crane game machine connected through the network to directly operate the crane game machine while watching the operation process without visiting the crane game machine in person, the convenience of the user can be improved, and the very realistic gaming experience can be obtained.

In addition, since it is unnecessary to periodically restock the crane game machine with prizes, a convenience of an operator of the crane game machine can be improved.

In addition, since a plurality of cameras configured to capture the crane game machine are installed to provide the user with viewpoints of various angles, a convenience of a user can be increased.

Further, since the crane game machine is selected through on-line to play a game, and a purchase-target article is purchased by using a token generated according to a game result, a desired product can be purchased other than products which are easy to be stocked in the crane game machine, such as dolls, so that various prizes can be provided.

MODE FOR INVENTION

Best Mode

Figure 1:
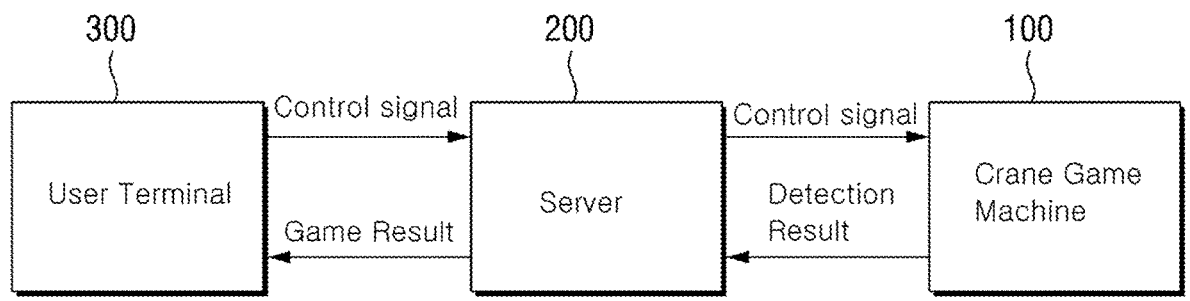
FIG. 1 is a block diagram showing a crane game system according to one embodiment of the present invention.

Hereinafter, exemplary embodiments of the present invention will be described in detail with reference to the accompanying drawings. Advantages and features of the present invention and methods of accomplishing the same will be understood more readily with reference to the following detailed description of embodiments taken in conjunction with the accompanying drawings. However, the present invention may be embodied in various other forms, and should not be construed as being limited to the embodiments set forth herein. The embodiments are provided so that the disclosure of the present invention will be thorough and complete, and will fully convey the scope of the invention to those of ordinary skill in the art to which the present invention pertains. The present invention will only be defined by the scope of the appended claims. Like reference numerals refer to like elements throughout the specification.

Unless defined otherwise, all terms (including technical terms and scientific terms) used herein have the same meaning as how they are generally understood by those skilled in the art to which the present invention pertains. In addition, unless expressly and explicitly defined otherwise, any term that is defined in a general dictionary shall not be interpreted to have an idealistic or excessive meaning. The terms used herein are intended to describe certain embodiments only, and shall by no means limit the present invention. In the present specification, unless the context explicitly dictates otherwise, expressions in a singular form include a meaning of a plural form.

FIG. 1 is a block diagram showing a crane game system according to one embodiment of the present invention.

Hereinafter, the configuration and operation of a crane game system according to one embodiment of the present invention will be described in detail with reference to FIG. 1. For convenience of explanation, the crane game system is also referred to as a system in the following description.

Referring to FIG. 1, the system may include a user terminal 300, a server 200, and a crane game machine 100. The user terminal 300, the server 200, and the crane game machine 100 may be configured to transmit and receive data between each other. The user terminal 300 and the server 200 may be configured as, for example, one of a fixed display device such as a desktop computer, a TV, and a digital signage, and a mobile display device such as a laptop, a smartphone, a tablet PC, a portable terminal, and a wearable device.

The user terminal 300 may receive an internal image of the crane game machine 100 from the server 200. The user terminal 300 may provide the received internal image to a user. The user may operate the user terminal 300 while watching the internal image. The user terminal 300 may transmit a control signal for controlling the crane game machine 100 to the server 200 according to the operation of the user. The control signal may include a prize moving unit control signal for moving a prize moving unit of the crane game machine 100. The user terminal 300 may provide a game result received through the server 200 to the user. The user terminal 300 may include a display unit configured to display the internal image and the game result. In addition, the user terminal 300 may include a user input unit configured to receive an input of the user. The user input unit may be implemented as a button provided in the user terminal 300, a touch panel provided on a front surface of the display unit, and the like.

The server 200 may mediate communication between the user terminal 300 and the crane game machine 100. The server 200 may transmit a detection result received from the crane game machine 100 to the user terminal 300 as a game result, and store the transmitted detection result in a database (DB) as the game result of the user. As an example, the server 200 may identify the number of times a prize has passed a score point based on the received detection result. The server 200 may store a score corresponding to the number of times the prize has passed the score point in the DB as the game result of the user. The game result may be stored in the form of a token. The token may be used as a virtual currency for purchasing a prize desired by the user in future. The server 200 may store different scores based on a size, a form, a type, a color, and the like of the prize passing through the score point. For example, the server 200 may store more tokens in the DB of the user as the size of the prize moved to the score point by the operation of the user increases, and may store different types of tokens in the DB of the user depending on the form/type of the prize. The user may purchase a desired purchase-target article by using mutually different types of tokens. The description thereof will be given below.

The crane game machine 100 may accommodate a prize therein. A plurality of prizes may be prepared. The crane game machine 100 may capture an inside thereof by a camera to generate an internal image, and transmit the internal image to the server 200. The crane game machine 100 may attempt to move the prize inside the crane game machine 100 to the score point based on the prize moving unit control signal received through the server 200. The prize moving unit control signal received through the server 200 may be a control signal for instructing a movement of a prize moving unit 103. The crane game machine 100 may detect whether the prize passes through the score point, and transmit a detection result to the server 200. The detection result may include a weight, a size, a form, a type, and the like of the prize passing through the score point.

In order to enjoy a game smoothly, the most important thing is to receive the internal image by the user terminal 300 without disconnection. To this end, the user terminal 300 and the server 200 may receive the internal image through an adaptive streaming scheme. The adaptive streaming scheme refers to a scheme in which an electronic device may recognize a network environment by itself and adaptively change a resolution of an image to transmit and receive the image. A resolution of the internal image provided to the user may vary depending on the network environment. For example, when a communication status is not excellent, the server 200 may encode the internal image with a low resolution and transmit the encoded internal image, and when the communication status is excellent, the server 200 may encode the internal image with a high resolution and transmit the encoded internal image. The communication status may be determined by using a response speed between the server 200 and the user terminal 300. The server 200 and the user terminal 300 may perform communication with each other to check the communication status. The server 200 may generate a resolution signal indicating that the internal image with a low resolution will be transmitted based on the communication status. When the resolution signal is received, the user terminal 300 may decode the received internal image based on the received resolution signal, and display the decoded internal image on the display unit.

The adaptive streaming scheme may be applied between the crane game machine 100 and the server 200.

Although not shown in FIG. 1, the system may further include an intermediary server configured to mediate data transmission, a synchronization server configured to synchronize data, and the like in addition to the user terminal 300, the server 200, and the crane game machine 100.

Figure 2:
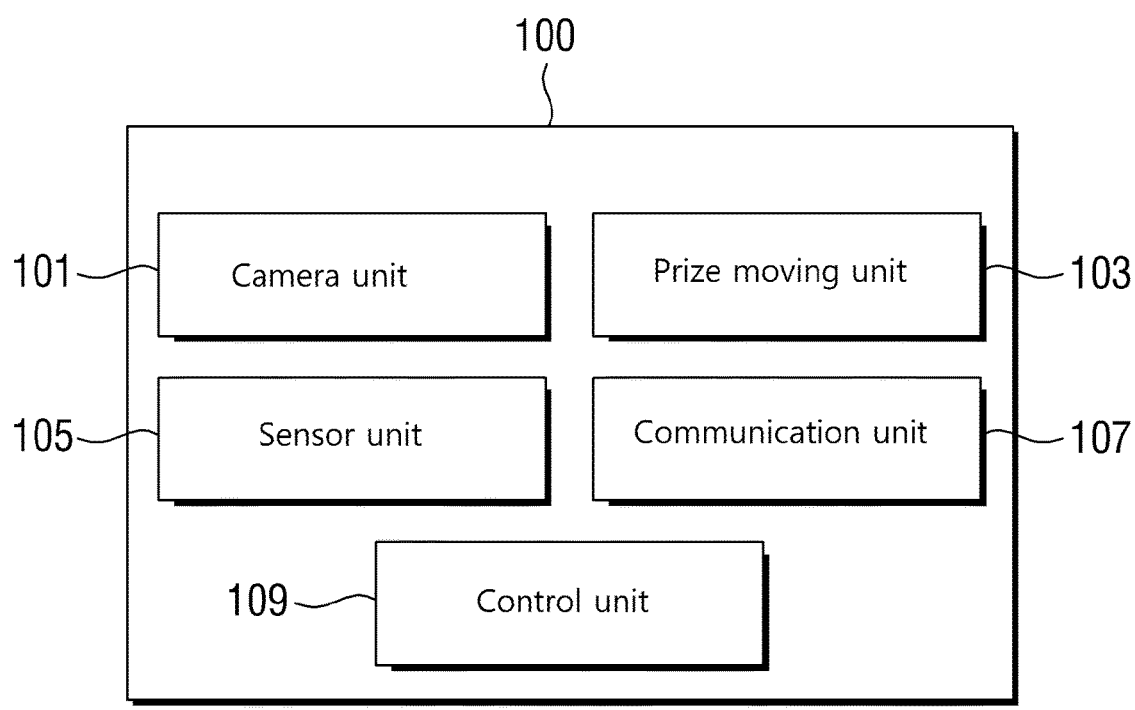
FIG. 2 is a block diagram showing a crane game machine according to one embodiment of the present invention.
Figure 3:
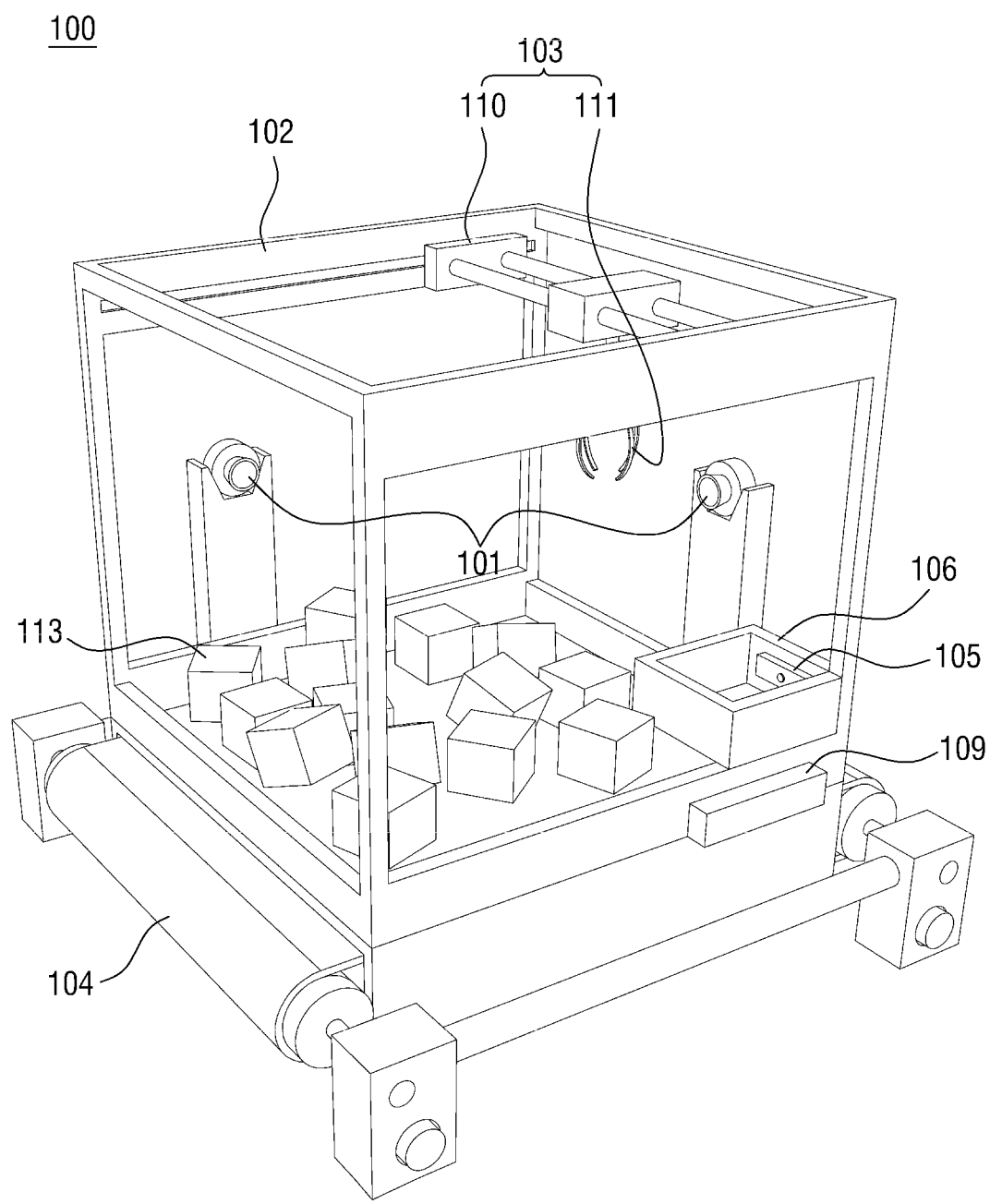
FIG. 3 shows the crane game machine according to one embodiment of the present invention.

FIG. 2 is a block diagram showing a crane game machine according to one embodiment of the present invention. In addition, FIG. 3 is a perspective view showing the crane game machine according to one embodiment of the present invention.

Referring to FIG. 2, the crane game machine 100 according to one embodiment of the present invention may include a camera unit 101, a prize moving unit 103, a sensor unit 105, a communication unit 107, and a control unit 109. The crane game machine 100 according to one embodiment of the present invention may further include at least one of a prize passing part 106 and a prize circulation unit 104.

A main body 102 may accommodate each of components of the crane game machine 100. In addition, a prize 113 may be accommodated in the main body 102. A plurality of prizes 113 may be prepared, and each of the prizes 113 may have mutually different forms, weights, or sizes. The main body 102 may have a rectangular parallelepiped shape as shown in FIG. 3, but the shape is not limited thereto. In addition, a portion of the main body 102 may be formed of a transparent material so that an inside of the main body 102 may be viewed from an outside.

The camera unit 101 may capture the inside of the main body 102 and transmit a generated internal image to the control unit 109. The camera unit 101 may include a plurality of cameras configured to capture the inside of the main body 102 from various angles. The camera unit 101 may include an optical module including a lens and an image processing unit configured to detect incident light and convert an image of a subject formed on the lens into an image that is an electrical signal. The image processing unit may include a charge-coupled device (CCD).

In an additional embodiment, the camera unit 101 may be configured to move a position based on a camera unit control signal. The camera unit 101 may move up, down, left, and right, and may further include a camera unit moving unit configured to move the camera unit 101 based on the camera unit control signal.

The prize moving unit 103 may be provided at an upper portion of the main body 102. The prize moving unit 103 may be configured to pick up the prize 113 and move the prize 113 to a score point located inside the main body 102.

The prize moving unit 103 may be configured to move up, down, left, and right at the upper portion of the main body. The prize moving unit 103 may move based on the prize moving unit control signal received from the server 200, and after the movement is completed, the prize moving unit 103 may move downward from a position where the movement is completed to perform an operation of picking up the prize 113. The prize moving unit 103 may finish the operation of picking up the prize 113, move upward to the upper portion of the main body, and move to the score point. After the movement is finished, the prize moving unit 103 may perform an operation of releasing the prize 113. The operation of the prize moving unit 103 may be performed regardless of whether the prize moving unit 103 has actually grabbed the prize 113. The prize moving unit 103 may move downward by a predetermined distance from a point where the movement is completed. The predetermined distance may be set in a production stage of the crane game machine 100. In addition, the predetermined distance may be changed based on a length setting control signal received from the user terminal 300.

In another embodiment, the prize moving unit 103 may move downward in the main body 102 until the prize moving unit 103 makes contact with the prize 113. The prize moving unit 103 may move downward, and when it is determined that the prize moving unit 103 has made contact with the prize 113, the prize moving unit 103 may immediately perform the operation of picking up the prize 113 and move to the upper portion of the main body 102. To this end, the prize moving unit 103 may include a sensor capable of identifying whether the prize 113 makes contact with the prize moving unit 103.

As an additional example, the user may input a distance by which the prize moving unit 103 is to move downward through the user terminal 300 during the movement of the prize moving unit 103. An input operation may be performed in various forms. The user terminal 300 may generate a downward movement control signal corresponding to a time during which a joystick-type icon is dragged downward, a time during which a button-type icon is pressed, and the like. The user terminal 300 may transmit the generated downward movement control signal to the server 200. The prize moving unit 103 may move downward by a distance corresponding to the downward movement control signal received from the server 200.

The prize moving unit 103 may include a crane unit 111 configured to move downward to perform an operation of picking up the prize 113 and an operation of releasing the prize 113 at the upper portion of the main body 102, and a moving unit 110 configured to move the crane unit 111 up, down, left, and right at the upper portion of the main body 102. The moving unit 110 may include a plurality of motors and rollers to move the crane unit 111.

The sensor unit 105 may be provided at the score point. The sensor unit 105 may be configured to detect whether the prize 113 passes through the score point. The sensor unit 105 may include at least one of various sensors capable of detecting passing of an object through a specific region, such as a touch sensor, a motion sensor, an infrared sensor, and a motion sensor. For example, the sensor unit 105 may detect whether the prize passes through the score point after the prize moving unit 103 performs the operation of picking up the prize 113 and dropping the prize 113 on the score point. The prize passing part 106 may be provided at the score point to surround the score point. When the prize passing part 106 is provided at the score point, the sensor unit 105 may be provided in the prize passing part 106 to detect whether the prize 113 passes through the prize passing part 106. The sensor unit 105 may be configured to detect at least one of a type, a shape, a size, and a color of the prize 113 passing through the prize passing part 106.

The prize passing part 106 may be formed at a top and a bottom thereof with an opening. The opening of the prize passing part 106 may be configured to surround the score point. In other words, when the prize 113 released from the prize moving unit 103 passes through the opening of the prize passing part 106, the prize 113 may pass through the score point. The prize passing part 106 may be configured such that the prize 113 may pass through the score point only when the prize moving unit 103 drops the prize 113 at a correct position. For example, when the prize moving unit 103 releases the prize 113 such that the prize 113 deviates from the score point, the prize 113 may hit an outer edge of the prize passing part 106 and fall back to a bottom of the main body 102 without passing through the prize passing part 106. The prize 113 may hit the outer edge and pass through the score point depending on a falling direction and characteristics of the prize 113. The prize passing part 106 may have a smaller opening or an opening having a different shape in order to increase the difficulty of the game.

The prize passing part 106 may be configured such that the opening is located inside the main body 102 so that the passing prize 113 may be accommodated in the main body 102 again. Accordingly, the prize 113 passing through the prize passing part 106 may be moved again by the prize moving unit 103.

Although the prize passing part 106 has been shown in FIG. 3 as having a rectangular frame shape, the configuration is provided for illustrative purposes only, and the prize passing part 106 may have various shapes for allowing the prize to pass therethrough, such as a pipe shape and a tube shape. The prize passing part 106 may have various shapes such as a basketball hoop shape with a basket and a net, a shape corresponding to a shape of the accommodated prize 113, a triangular frame, and a circular frame.

As an additional embodiment, the prize passing part 106 may have a bottom surface configured to block the score point. The bottom surface may have a mesh structure such as a net. In this case, the sensor unit 105 may detect whether the prize 113 is caught in the prize passing part 106. In the crane game machine 100 according to one embodiment of the present invention, the prize passing part 106 may further include a prize discharge unit configured to discharge the prize 113 to the outside by overturning the prize passing part 106 or opening the bottom of the prize passing part 106 when the prize 113 is caught in the prize passing part 106.

As another embodiment of the present invention, a plurality of score points may be provided inside the main body 102. The prize passing part 106 may be provided at each of the score points. The prize passing parts 106 provided at mutually different score points may have mutually different sizes, heights, and attachment angles. The prize moving unit 103 may move the picked-up prize 113 to one of a plurality of prize passing parts 106 based on the prize moving unit control signal received from the server 200.

When the prize passing part 106 is provided inside the main body 102, the sensor unit 105 may detect a prize passing part 106 through which the prize 113 has passed and transmit a result to the server 200. The server 200 may assign different scores according to prize passing parts 106 through which the prize 113 has passed. For example, the server 200 may store the score of the user from the detected result in various ways such as giving a higher score when the prize 113 passes through a narrower prize passing part 106 or when the prize 113 passes through a prize passing part 106 that is further away within a limited time.

The communication unit 107 may communicate with the outside of the crane game machine 100. The communication unit 107 may allow the crane game machine 100 to communicate with external devices and to transmit and receive data. The transmitted and received data may have various types, such as a voice, an image, a text, and a video, and are not limited to the above examples.

The communication unit 107 may include a connection unit for wired communication to communicate with the external device. The connection unit may transmit/receive signals/data according to standards such as high definition multimedia interface (HDMI), HDMI-consumer electronics control (HDMI-CEC), USB, and component, and may include at least one connector or terminal corresponding to each of the standards. The crane game machine 100 may perform the wired communication with a plurality of servers through a wired local area network (LAN).

Types of communication supported by the communication unit 107 are not limited to the wired communication. The communication unit 107 may include a radio frequency (RF) circuit configured to transmit and receive an RF signal to perform wireless communication, and may be configured to perform communication through at least one of Wi-fi, Bluetooth, Zigbee, ultra-wide band (UWM), wireless USB, and near field communication (NFC).

The communication unit 107 may be configured to transmit the internal image of the crane game machine 100 from the server 200 in real time.

The prize circulation unit 104 may be configured to circulate the prize 113 accommodated in the main body. The prize circulation unit 104 may be configured to periodically circulate the prize 113. In addition, the prize circulation unit 104 may circulate the prize 113 based on a circulation control signal received from the user terminal 300. For example, when the user issues a command through the user terminal 300 to circulate the prize 113, the user terminal 300 may transmit the circulation control signal to the crane game machine 100 through the server 200. The circulation control signal may include information on a time and an intensity of circulating the prize 113. When the circulation control signal is received, the prize circulation unit 104 may circulate the prize 113 by the time and the intensity based on the circulation control signal.

The prize circulation unit 104 may be provided at the bottom of the main body 102. The prize circulation unit 104 may be configured in the form of a tread mill. The prize circulation unit 104 may be formed of a flexible material such as cloth, rubber, and a synthetic resin, and may include a support plate configured to support the prize 113 and a plurality of rollers configured to rotate the support plate. A plurality of protrusions may be provided on a top surface of the support plate. As the support plate rotates, the protrusions may push the prize 113 to circulate the prize 113.

As another embodiment of the present invention, the prize circulation unit 104 may be provided at a center of the bottom of the main body 102, and may include a motor which is rotationally driven and a rotating arm connected to the motor and configured to rotate about the center of the bottom of the main body 102 to circulate the prize 113.

As an additional embodiment of the present invention, the prize circulation unit 104 may include a rotating disc provided at the bottom of the main body, and a motor which is rotationally driven to rotate the rotating disc. A plurality of protrusions may be provided on a top surface of the rotating disc. As the rotating disc rotates, the protrusions may push the prize 113 to circulate the prize 113.

The control unit 109 may perform the control for operating all the components of the crane game machine 100 according to one embodiment of the present invention. The control unit 109 may include a control program for performing such a control operation, a non-volatile memory in which the control program is installed, a volatile memory in which at least a portion of the installed control program is loaded, and at least one microprocessor or central processing unit (CPU) configured to execute the loaded control program. The control program may include program(s) implemented in the form that is at least one of a BIOS, a device driver, an operating system, firmware, a platform, and an application program (application). In one embodiment, the application program may be installed or stored in the crane game machine 100 in advance upon manufacture of the crane game machine 100, or may be installed in the crane game machine 100 based on received data after data of the application program is received from the outside in future use. The data of the application program may be, for example, downloaded to the crane game machine 100 from an external server such as an application market.

The control unit 109 according to one embodiment of the present invention may control the communication unit 107 to transmit the internal image generated by capturing the inside of the main body 102 by the camera unit 101 and the detection result detected by the sensor unit 105 to the server 200. In addition, when the control unit 109 receives the prize moving unit control signal for controlling the prize moving unit 103 from the server 200, the control unit 109 may move the prize moving unit 103 based on the prize moving unit control signal, and may control the prize moving unit 103 to pick up the prize 113 and move the prize 113 to the score point.

Figure 4:
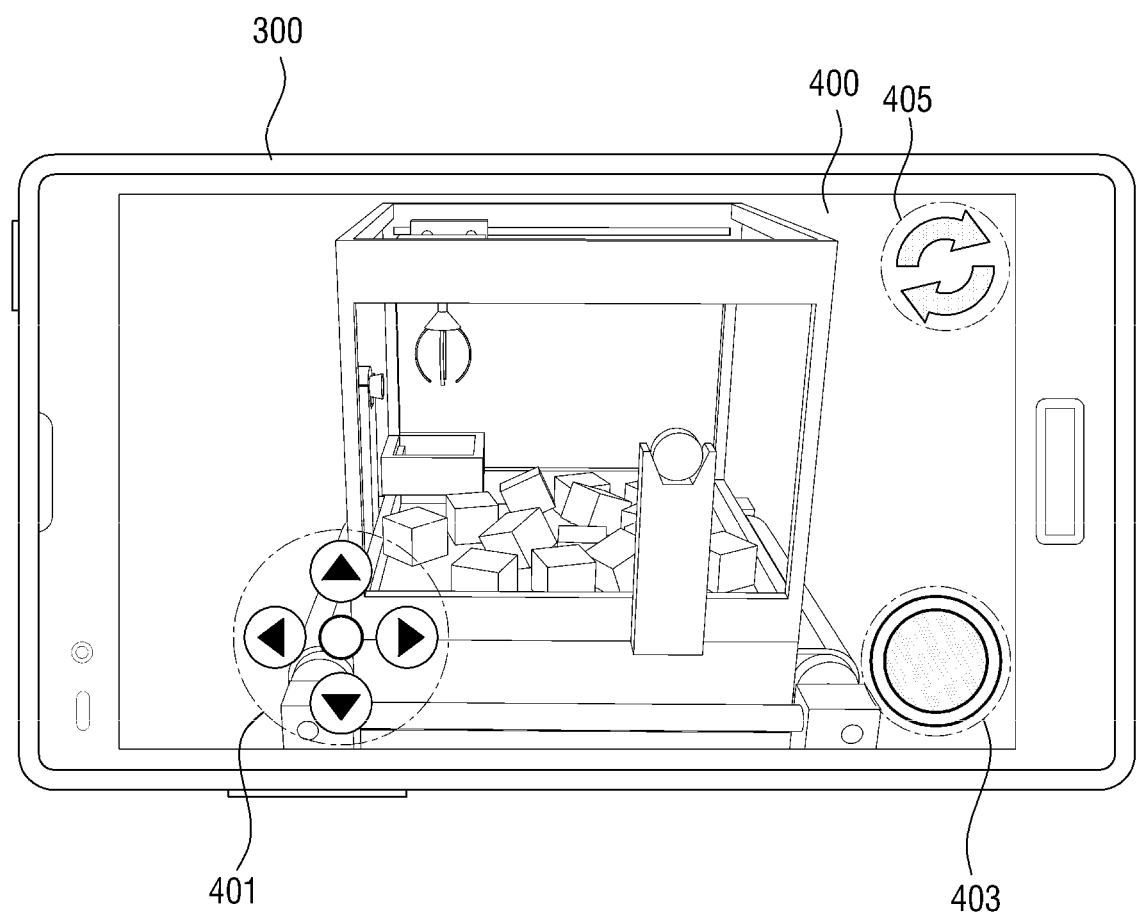
FIG. 4 shows an example of a user terminal for operating the crane game machine according to one embodiment of the present invention.

FIG. 4 shows an example of a user terminal for operating the crane game machine according to one embodiment of the present invention.

Referring to FIG. 4, a screen of the user terminal 300 operating the crane game machine 100 is shown. As an example, the user terminal 300 may be implemented as a smartphone provided at a front surface thereof with a touch panel.

The user terminal 300 may display an internal image 400 of the crane game machine 100 transmitted from the server 200. The user terminal 300 may display a movement icon 401, a pick-up icon 403, and a viewpoint shifting icon 405 together with the internal image 400. The user may touch the displayed icons to transmit a control signal corresponding to the touched icon to the crane game machine 100 through the server 200.

The movement icon 401 may be displayed through the display unit of the user terminal 300 so that the user may touch the movement icon 401 to control the prize moving unit 103 of the crane game machine 100 located in a remote place. The user terminal 300 may transmit a prize moving unit control signal corresponding to a touch of the user onto the movement icon 401 to the crane game machine 100 through the server 200. The movement icon 401 may include four direction keys to correspond to directions in which the prize moving unit 103 moves. For example, the user terminal 300 may transmit a prize moving unit control signal for moving the prize moving unit 103 upward when the user presses an up-direction button among the four direction keys, and a prize moving unit control signal for moving the prize moving unit 103 to the right when the user presses a right-direction button among the four direction keys to the crane game machine 100 through the server 200. In the present embodiment, the user may press the four direction keys a predetermined number of times. For example, the user may touch each of direction buttons once or twice, and may control the prize moving unit 103 to a desired place within a limited number of times of touches.

As another embodiment of the present invention, the movement icon 401 may be configured in the form of a joystick. The user terminal 300 may transmit a prize moving unit control signal for controlling the movement of the prize moving unit 103 according to a direction in which the user touches and drags the joystick-type movement icon 401 to the server 200.

As another embodiment of the present invention, the user terminal 300 may provide an image, which is obtained by capturing the crane game machine 100 from a top and received from the server 200, as the internal image 400. In the present embodiment, the movement icon 401 may be omitted. When the user touches a desired point in the internal image 400, the user terminal 300 may transmit a prize moving unit control signal generated to move the prize moving unit 103 to a position touched by the user to the server 200.

The user may be provided with a predetermined time for controlling the prize moving unit 103, so that when the user may not move the prize moving unit 103 above the prize by operating the movement icon 401 within a limited time, the prize moving unit 103 may perform the operation of picking up the prize, but may not actually pick up the prize. A time for controlling the prize moving unit 103 may be displayed through the display unit of the user terminal 300. When there is not much control time left, the user terminal 300 may notify the user through a warning sound, vibrations, or the like.

As an additional example, when a plurality of prize passing parts 106 are provided, the user may additionally touch the movement icon 401 to operate the prize moving unit 103 such that the prize moving unit 103 may move the prize to a desired prize passing part 106. After performing the operation of picking up the prize, the prize moving unit 103 may move the prize based on the prize moving unit control signal received from the prize moving unit 103. In this case, the user is provided with a predetermined time, so that when the user may not move the prize moving unit 103, which has picked up the prize, above the desired prize passing part 106 by operating the movement icon 401 within a limited time, the prize may not pass through the prize passing part 106 desired by the user.

The pick-up icon 403 may be displayed through the display unit of the user terminal 300 to operate the prize moving unit 103 so that the user may touch the pick-up icon 403 to allow the prize moving unit 103 to perform an operation of moving downward from a current position and picking up the prize before completing the movement. The pick-up icon 403 may be configured in the form of a button. The user terminal 300 may transmit a pick-up control signal corresponding to a touch of the user onto the pick-up icon 403 to the crane game machine 100 through the server 200. The user terminal 300 may transmit a pick-up control signal corresponding to a time during which the user presses the pick-up icon 403 to the server 200. The server 200 may adjust a length by which the crane unit 111 of the prize moving unit 103 moves downward to correspond to the time during which the user presses the pick-up icon 403. For example, server 200 may transmit the pick-up control signal corresponding to the time during which the user presses the pick-up icon 403 to the crane game machine 100 such that the crane unit 111 may move downward by a longer length when the user presses the pick-up icon 403 for a long time, and the crane unit 111 may move downward by a shorter length when the user presses the pick-up icon 403 for a short time.

As another embodiment of the present invention, the pick-up icon 403 may operate as a release icon after the prize moving unit 103 picks up the prize. For example, when the user presses the pick-up icon 403 to allow the prize moving unit 103 to pick up the prize and the user touches the pick-up icon 403 again while moving, the user terminal 300 may transmit a release control signal to the server 200. The server 200 may transmit the received release control signal to the crane game machine 100. The prize moving unit 103 may release the prize on a place in response to the release control signal received from the server 200.

As an additional embodiment of the present invention, the user may set a length by which the crane unit 111 moves downward through the user terminal 300 in advance. When the user inputs the length by which the crane unit 111 moves downward through the user terminal 300, the user terminal 300 may transmit a length setting control signal corresponding to the user input to the crane game machine 100 through the server 200. The control unit 109 of the crane game machine 100 may set the length for moving downward based on the length setting control signal, and may control the prize moving unit 103 such that the crane unit 111 may move downward by the set length.

The user may view a current state of the crane game machine 100 through the internal image 400 in real time. The internal image 400 may be transmitted from the server 200 to the user terminal 300 in real time. In the description with reference to FIG. 1, the user terminal 300 has been described as being capable of performing communication with the server 200 in the adaptive streaming scheme. If the user does not desire to change a resolution of the internal image 400, the user may request the server 200 to transmit the internal image 400 with a fixed resolution. To this end, the user terminal 300 may additionally provide an icon for adjusting the resolution of the displayed internal image 400.

The viewpoint shifting icon 401 may be displayed through the display unit of the user terminal 300 so that the user may touch the viewpoint shifting icon 401 to shift a viewpoint of the image received through the camera unit 101. As described with reference to FIGS. 2 and 3, the camera unit 101 may include a plurality of cameras. The internal image 400 may be an image captured by one of the cameras. The server 200 may select one of the cameras of the crane game machine 100 as a current camera, and may transmit an image captured by the current camera to the user terminal 300 as the internal image 400. When the user desires to observe the inside of the crane game machine 100 at another viewpoint, the user may touch the viewpoint shifting icon 401. When the viewpoint shifting icon 401 is touched, a viewpoint shifting control signal may be transmitted to the server 200. The server 200 may change the current camera to another one camera among the cameras, and may transmit an image captured by the changed current camera to the user terminal as the internal image 400. As an example, only one camera set as the current camera by the server 200 may operate among the cameras, and the remaining cameras may be in a standby state. As another example, all of the cameras may operate to transmit captured images to the server 200, and the server 200 may transmit the image captured by the current camera among the images captured by the cameras to the user terminal 300 as the internal image 400.

As an additional embodiment, the user terminal 300 may further provide a camera moving icon for moving the camera unit 101. When the user operates through the camera moving icon, the user terminal 300 may transmit the camera unit control signal to the server 200. The server 200 may transmit the camera unit control signal to the crane game machine 100. The control unit 109 of the crane game machine 100 may control the camera unit moving unit to move a selected camera among the cameras based on the camera unit control signal.

Figure 5:
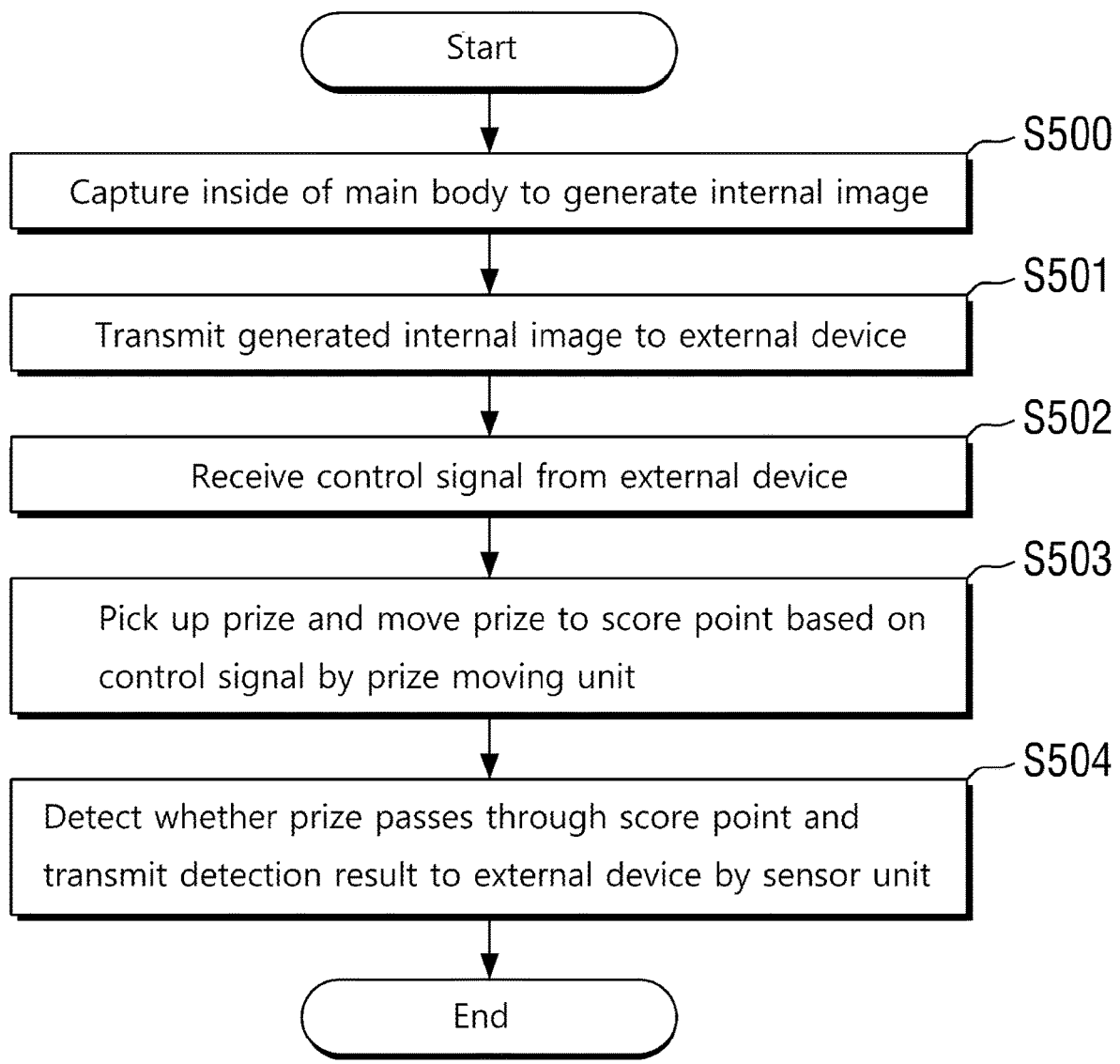
FIG. 5 is a control flow chart of the crane game machine according to one embodiment of the present invention.

FIG. 5 is a control flow chart of the crane game machine according to one embodiment of the present invention.

FIG. 5 will be described with reference to the crane game machine 100 shown in FIG. 3. First, in operation S500, the camera unit 101 may capture the inside of the main body 102 of the crane game machine 100 to generate the internal image. In addition, in operation S501, the control unit 109 may transmit the generated internal image to an external device through the communication unit 107. In this case, the external device may be the server 200 described with reference to FIG. 1. Thereafter, in operation S502, the communication unit 107 may receive a control signal from the external device. The control signal may include a prize moving unit control signal for controlling the prize moving unit 103, a viewpoint shifting control signal for shifting a camera viewpoint, a length setting control signal for setting a length by which the prize moving unit 103 moves downward to pick up the prize, a pick-up control signal and a release control signal for instructing the prize moving unit 103 to immediately pick up or release the prize 113, and the like. In addition, in operation S503, when the prize moving unit control signal is received, the prize moving unit 103 may pick up the prize 113 and move the prize to the score point based on the prize moving unit control signal. Finally, in operation S504, the sensor unit 105 may detect whether the prize 113 passes through the score point. The control unit 109 may transmit a detection result to the external device through the communication unit 107.

Figure 6:
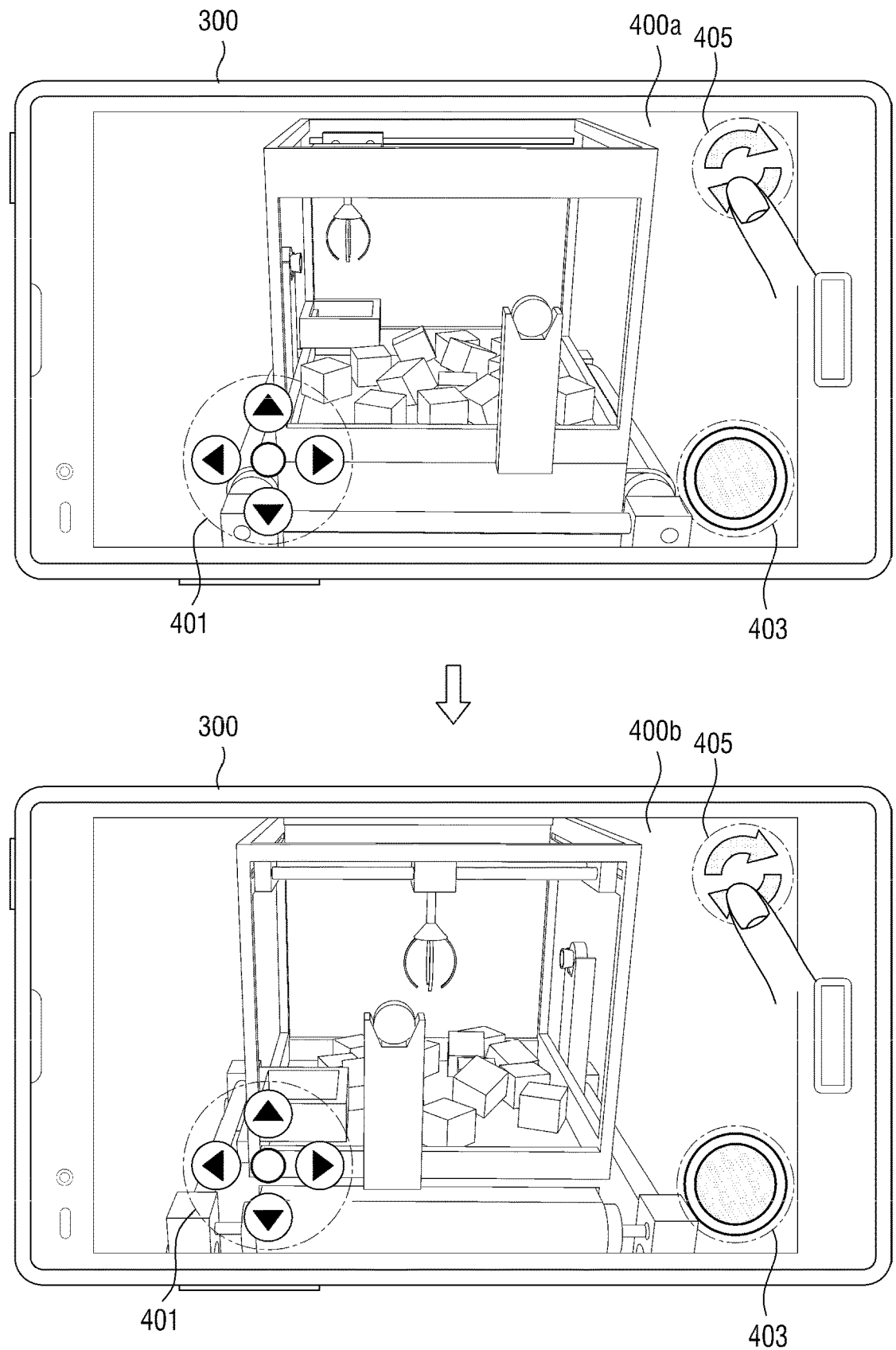
FIG. 6 shows an example in which a viewpoint for an internal image of a crane game is shifted according to one embodiment of the present invention.

FIG. 6 shows an example in which a viewpoint for an internal image of a crane game is shifted according to one embodiment of the present invention.

Referring to an upper drawing in FIG. 6, the user terminal 300 may display an internal image 400a obtained from a first viewpoint and received from the server 200. The internal image 400a obtained from the first viewpoint refers to an image of the main body 102 of the crane game machine 100, which is captured by a first camera set as the current camera by the server 200 among the cameras of the camera unit 101 that are provided at various angles.

When the user touches the viewpoint shifting icon 401, the user terminal 300 may transmit the viewpoint shifting control signal to the server 200 in response to the touch of the user. The server 200 may transmit an internal image 400b obtained from a second viewpoint to the user terminal 300 based on the viewpoint shifting control signal.

Referring to a lower drawing in FIG. 6, the user terminal 300 may display the internal image 400b obtained from the second viewpoint and received from the server 200. The internal image 400b obtained from the second viewpoint refers to an image of the main body 102, which is captured by a second camera set as the current camera by the server 200 among the cameras of the camera 101. The first camera and the second camera may capture the main body 102 from mutually different positions.

First, one embodiment of the present invention will be described. The first camera set as the current camera in the crane game machine 100 may capture the main body 102. The crane game machine 100 may provide an image captured by the first camera to the server 200. The second camera which is not the current camera may be in the standby state. The server 200 may provide an image received from the crane game machine 100 to the user terminal 300 as the internal image 400a obtained from the first viewpoint. The server 200 may set the second camera as the current camera based on the viewpoint shifting control signal received from the user terminal 300, and may transmit the viewpoint shifting control signal to the crane game machine 100. The second camera, which is in the standby state, may capture the main body 102 and provide an image based on the viewpoint shifting control signal. The crane game machine 100 may provide the image captured by the second camera to the server 200. The server 200 may provide the received image to the user terminal 300 as the internal image 400*b* obtained from the second viewpoint.

Another embodiment of the present invention will be described. Both the first camera and the second camera of the crane game machine 100 may capture the main body 102. The crane game machine 100 may provide both images captured by the first camera and the second camera to the server 200. The server 200 may provide the image captured by the first camera set as the current camera among the received images to the user terminal 300 as the internal image 400*a* obtained from the first viewpoint. In addition, the server 200 may set the second camera as the current camera based on the viewpoint shifting control signal received from the user terminal 300, and may transmit the image received from the second camera to the user terminal 300 as the internal image 400*b* obtained from the second viewpoint.

An additional embodiment of the present invention will be described. The camera may capture the main body 102 at a first position of the crane game machine 100. The crane game machine 100 may provide an image captured by the camera at the first position to the server 200. The server 200 may provide the image received from the crane game machine to the user terminal 300 as the internal image 400*a* obtained from the first viewpoint. In addition, the server 200 may transmit the camera unit control signal received from the user terminal 300 to the crane game machine 100. The control unit 109 may control the camera unit moving unit to move the camera based on the camera unit control signal. The camera may provide an image captured at a moved second position to the server 200. The server 200 may provide the image received from the crane game machine to the user terminal 300 as the internal image 400*b* obtained from the second viewpoint. The image may be provided while the camera moves from the first position to the second position, and the user may watch a process of shifting the viewpoint through the user terminal 300.

Figure 7:
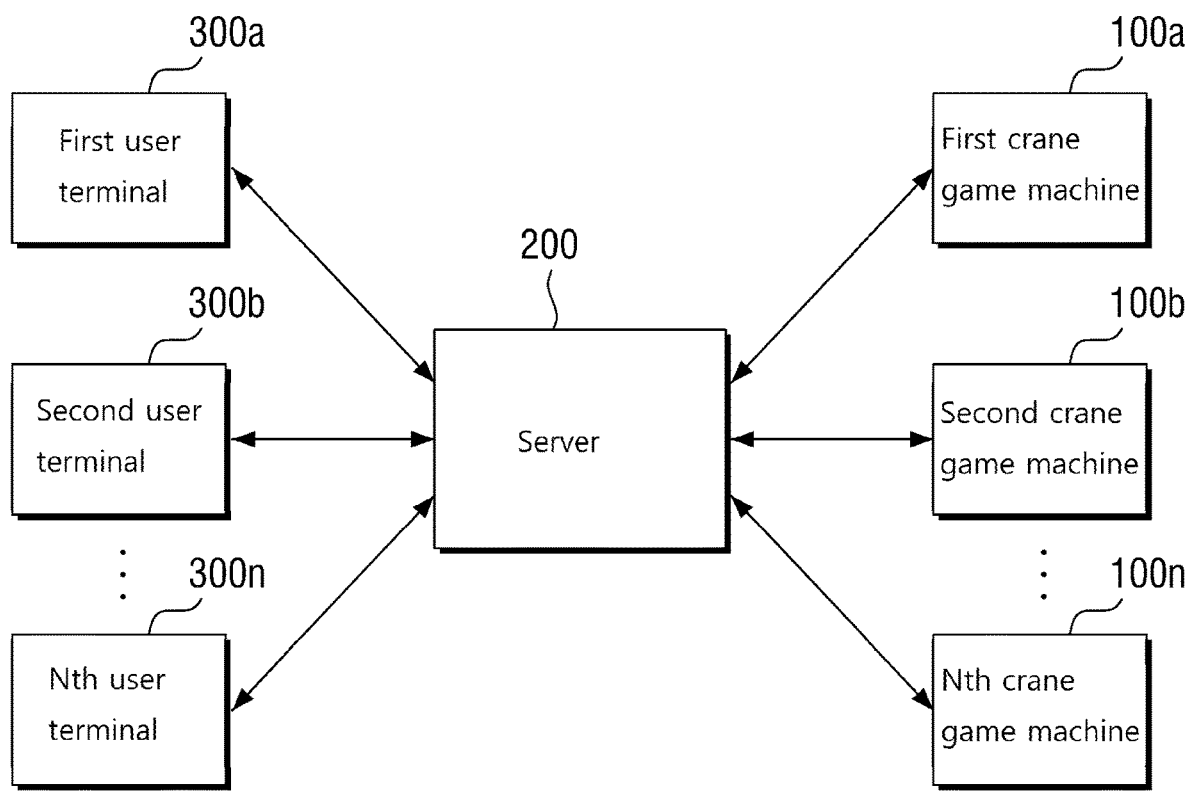
FIG. 7 is a block diagram showing a crane game system according to another embodiment of the present invention.

FIG. 7 is a block diagram showing a crane game system according to another embodiment of the present invention.

Referring to FIG. 7, the system may include a plurality of user terminals 300*a* to 300*n*, a server 200, and a plurality of crane game machines 100*a* to 100*n*. A plurality of users may respectively operate their own user terminals 300*a* to 300*n*, connect to the server 200, and select a desired crane game machine 100*a* to 100*n* to play the game.

In this case, each of the user terminals 300*a* to 300*n* may operate only one crane game machine 100*a* to 100*n*. Similarly, one crane game machine 100*a* to 100*n* may be controlled only by one user terminal 300*a* to 300*n*. For example, when a first user is playing the game by selecting a first crane game machine 100*a* through the server 200 by using a first user terminal 300*a*, the server 200 may change a state of the first crane game machine 100*a* to an occupied state. A second user may operate a second user terminal 300*b* to apply for watching or waiting for the first crane game machine 100*a*. In addition, the second user terminal 300*b* may play the game by selecting the second crane game machine 100*b* that is not occupied by another user. When the first user completes the game while the second user is waiting for the first crane game machine 100*a*, the second user may play a next game. If a third user has been waiting for the first crane game machine 100*a* before the second user, the third user may play the next game, and the second user may need to wait more.

When the second user applies for watching the first crane game machine 100*a*, the second user may watch the game which is being played by the first user. The server 200 may transmit the internal image to both the first user terminal 300*a* and the second user terminal 300*b*. In this case, the internal image provided by the first user terminal 300*a* and the second user terminal 300*b* may have mutually different viewpoints. For example, the server 200 may transmit the internal image obtained from the first viewpoint to the first user terminal 300*a*, and may transmit the internal image obtained from the second viewpoint to the second user terminal 300*b* based on the viewpoint shifting control signal received from the second user terminal 300*b*. However, when the camera unit moving unit is provided in the camera unit 101, only the first user who is playing the game may move the camera that performs the capturing.

The second user may simultaneously apply for watching and waiting for the first crane game machine 100*a*.

As another embodiment of the present invention, one user terminal 300*a* to 300*n* may operate a plurality of crane game machines 100*a* to 100*n*. In this case, a plurality of internal images may be provided to the user terminals 300*a* to 300*n*, and the user may operate the user terminals 300*a* to 300*n* to play a plurality of games at once.

The spirit of the present invention is not limited to the drawings and the above description. In particular, the number of the user terminals 300*a* to 300*n* and the crane game machines 100*a* to 100*n* shown in the drawing and the operations of the system described above are provided for illustrative purposes only, and are not intended to limit the system according to the present invention.

Hereinafter, specific operations of a system including a plurality of user terminals 300*a* to 300*n* and a plurality of crane game machines 100*a* to 100*n* according to another embodiment of the present invention will be described.

First, an occupancy state user interface (UI) informing that each of the crane game machines 100*a* to 100*n* is occupied will be described with reference to FIG. 8 below.

Figure 8:
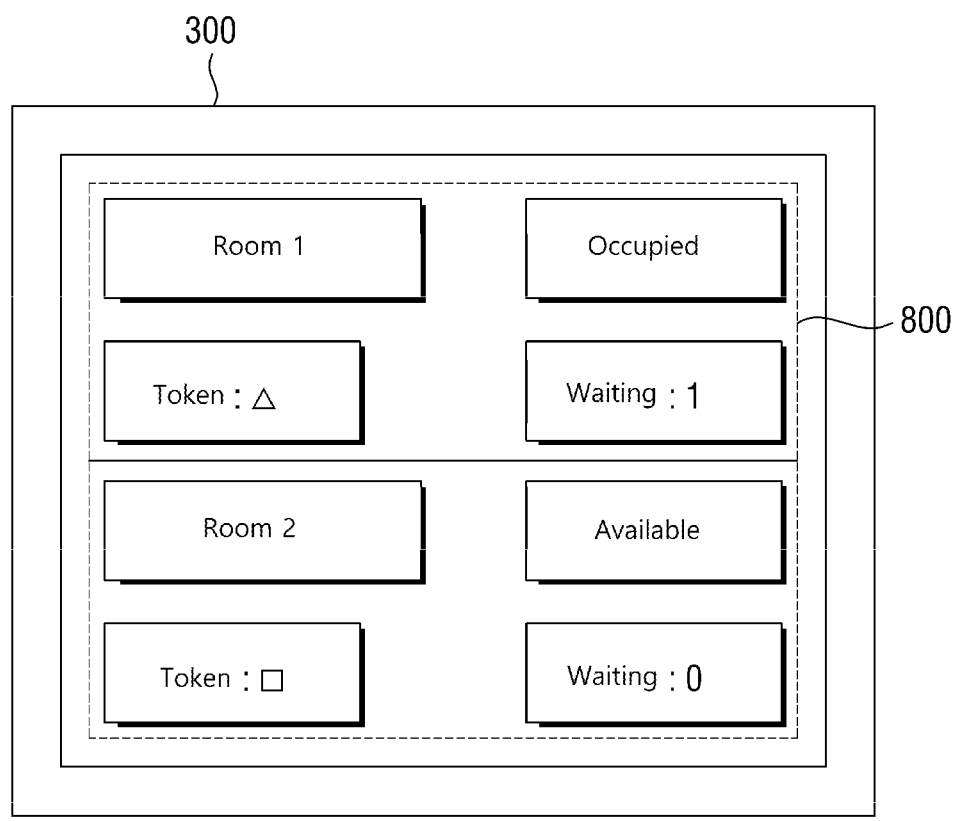
FIG. 8 shows an example of the user terminal for displaying an occupancy state of each of crane game machines according to one embodiment of the present invention.

FIG. 8 shows an example of the user terminal for displaying an occupancy state of each of crane game machines according to one embodiment of the present invention.

Referring to FIG. 8, the user terminal 300 may display a UI 800 informing the occupancy state of each of the crane game machines 100*a* to 100*n*, which is received from the server 200. The UI 800 may include a game machine number, a type of a provided token, a current occupancy state, and the number of waiting persons.

The UI 800 may be provided from the server 200 when the user terminal 300 accesses the server 200. As another example, in response to a request of the user terminal 300, the server 200 may provide the UI 800 informing the occupancy state to the requesting user terminal 300.

The UI 800 informing the occupancy state of the crane game machines 100 is not limited to the configuration shown in the drawing. Since the drawings are given for convenience of explanation, displayed items, numbers, sizes, shapes, and the like may vary to provide the occupancy state and other additional information of the crane game machines 100*a* to 100*n*.

Figure 9:
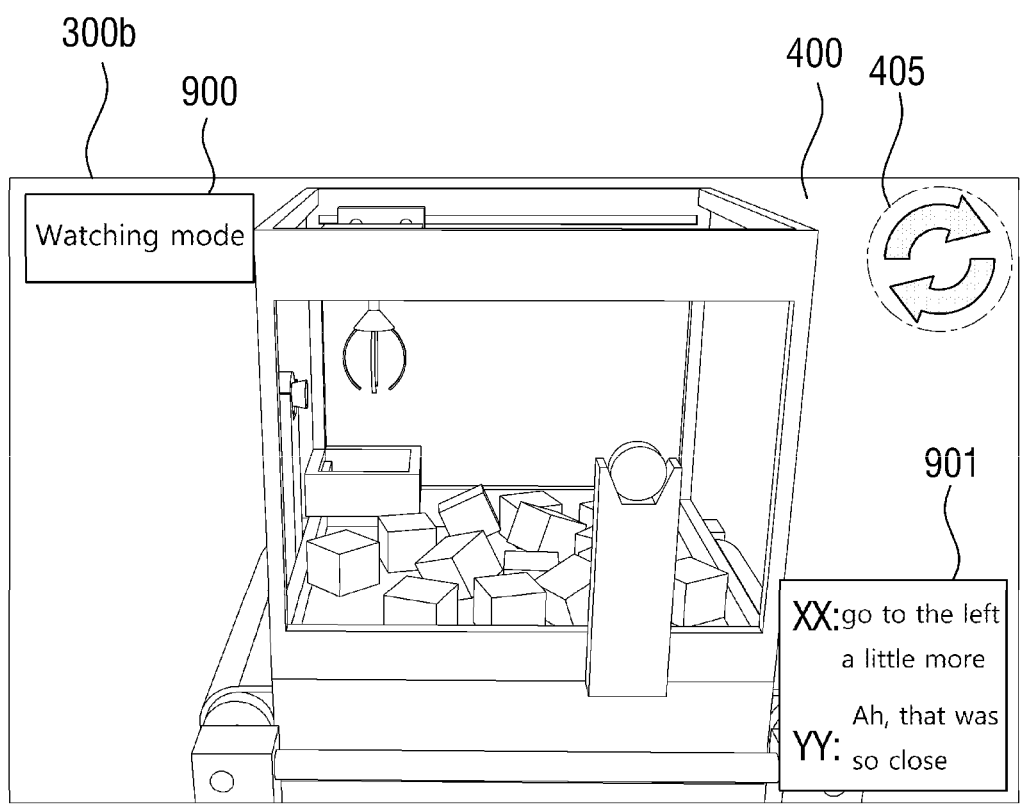
FIG. 9 shows an example of the user terminal watching a progress of the game according to one embodiment of the present invention.

FIG. 9 shows an example of the user terminal watching a progress of the game according to one embodiment of the present invention.

While the first user controls the first crane game machine 300*a* by operating the first user terminal 300*a*, the second user may operate the second user terminal 300*b* for watching the game to transmit a control signal corresponding to an application for watching the game to the server 200. The server 200 may transmit the internal image 400 provided by the camera unit 101 of the first crane game machine 100*a* to the first user terminal 300*a* as well as the second user terminal 300*b* which has applied for watching the game. The second user terminal 300*b* may provide the internal image 400 to the second user.

The second user terminal 300*b* may display the internal image 400, and may display an item 900 indicating that it is currently a watching mode and an item 901 for displaying a chat with other users. The user who is playing the game and users who are watching the game may chat with each other by inputting a character into each of the user terminals 300*a* to 300*n*.

Since the second user may not control the first crane game machine 100*a* that is being watched in the watching mode, the second user terminal 300*b* may not provide the movement icon and the pick-up icon described with reference to FIG. 4. However, the second user terminal 300*b* may provide the viewpoint shifting icon 401 even in the watching mode so that the second user may shift the viewpoint of the internal image 400. The second user may touch the viewpoint shifting icon 401 to request the server 200 for the internal image 400 obtained from another viewpoint.

Figure 10A:
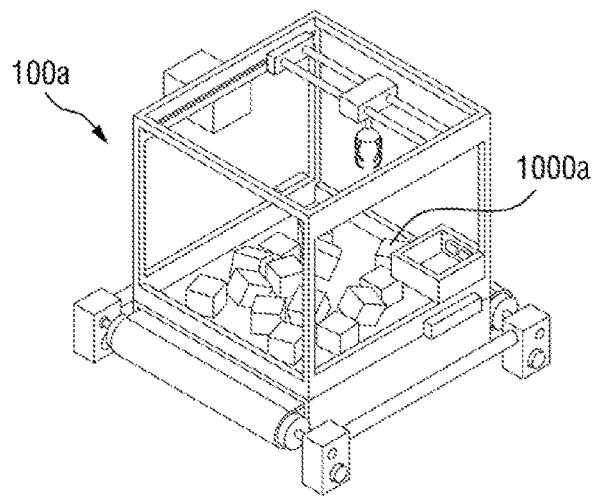
FIGS. 10A to 10C show examples of a plurality of crane game machines accommodating mutually different prizes according to one embodiment of the present invention.
Figure 10B:
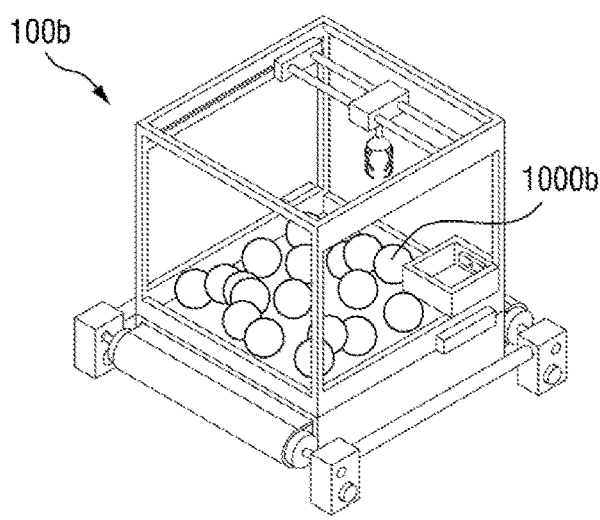
Figure 10C:
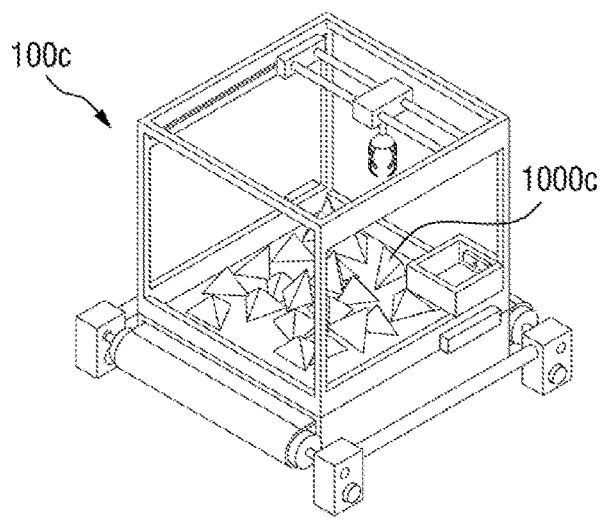

FIGS. 10A to 10C show examples of a plurality of crane game machines accommodating mutually different prizes according to one embodiment of the present invention.

A plurality of crane game machines 100*a* to 100*c* may accommodate mutually different prizes 1000*a* to 1000*c*. Each of the prizes 1000*a* to 1000*c* may have mutually different sizes, shapes, forms, types, colors, and the like.

For example, the first crane game machine 100*a* may accommodate a first prize 1000*a* having a cubic shape, the second crane game machine 100*b* may accommodate a second prize 1000*b* having a spherical shape, and a third crane game machine 100*c* may accommodate a third prize 1000*c* having a triangular pyramid shape.

The server 200 may provide a first token whenever the first prize 1000*a* of the first crane game machine 100*a* passes through the prize passing part, provide a second token whenever the second prize 1000*b* of the second crane game machine 100*b* passes through the prize passing part, and provide a third token whenever the third prize 1000*c* of the third crane game machine 100*c* passes through the prize passing part, in which the type of the provided tokens may vary for each of the crane game machines 100*a* to 100*c*.

As another example, one token may be provided when the first prize 1000*a* passes through the prize passing part, two tokens may be provided when the second prize 1000*b* passes through the prize passing part, and three tokens may be provided when the third prize 1000*c* passes through the prize passing part, in which the number of provided tokens may vary for each of the crane game machines 100*a* to 100*c*.

As an additional embodiment, each of the crane game machines 100*a* to 100*c* may be provided therein with mutually different components. As an example, the first crane game machine 100*a* may further include an obstruction unit configured to obstruct a pick-up operation. The obstruction unit may be provided with an air gun and the like, and may be configured to obstruct the operation of the prize moving unit 103 which picks up the first prize 1000*a*. The second crane game machine 100*b* may be provided therein with a plurality of prize passing parts 106. Whenever the second prize 1000*b* passes through each of the prize passing parts 106 of the second crane game machine 100*b*, the server 200 may provide mutually different types of tokens or different numbers of tokens to the user. The third crane game machine 100*c* may have a longer limited time for controlling the prize moving unit 103 than other crane game machines 100*a* and 100*b*. In addition, one crane game machine may include a view obstruction unit to block the view. Another crane game machine may further include a shake generating unit configured to shake the inside of the main body 102. In other words, mutually different components may be provided for each of the crane game machines 100*a* to 100*c*, and the type or number of the provided tokens may be mutually different for each of the crane game machines 100*a* to 100*c*. The user may have mutually different fun experiences through the above configuration, and may play various games to obtain desired tokens.

The spirit of the present invention is not limited to the drawings and the above description. In particular, the present invention is not limited to the number of the crane game machines 100*a* to 100*c* shown in the drawing and the shape or type of the prizes 1000*a* to 1000*c* included in each of the crane game machines 100*a* to 100*c*. Various crane game machines 100*a* to 100*c* may be provided, and various prizes 1000*a* to 1000*c* corresponding thereto may be provided in the crane game machines 100*a* to 100*c*.

Hereinafter, an example of using tokens obtained through various crane game machines 100*a* to 100*c* will be described with reference to FIGS. 11 to 12.

Figure 11:
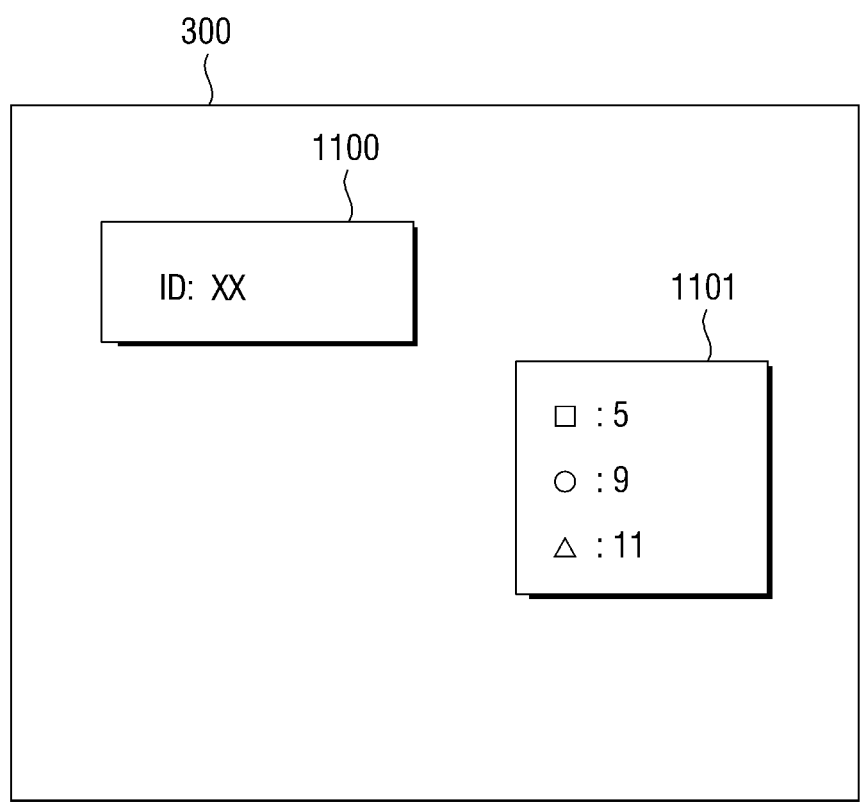
FIG. 11 shows an example of token information of a user according to one embodiment of the present invention.

FIG. 11 shows an example of token information of a user according to one embodiment of the present invention.

Referring to FIG. 11, the user terminal 300 may display identification information 1100 of a currently connected user and token information 1101 obtained by the user through the game. The token information 1101 may indicate various types of tokens and the number of respective tokens. Referring to the token information 1101, the user according to the present embodiment has acquired five first tokens having a '□' shape, nine second tokens having a '○' shape, and 11 third tokens having a 'Δ' shape.

The user may purchase a desired purchase-target article by paying the acquired tokens as a virtual currency.

The spirit of the present invention is not limited to the types of UI items and tokens and the number of types shown in the drawing. The types and number of tokens shown in the drawing are provided for illustrative purposes only, which indicates that various tokens may exist, and various types of tokens may be provided. In addition, the UI for informing the identification information 1100 of the user and the token information 1101 may also be implemented in various forms without being limited to the drawings.

Figure 12:
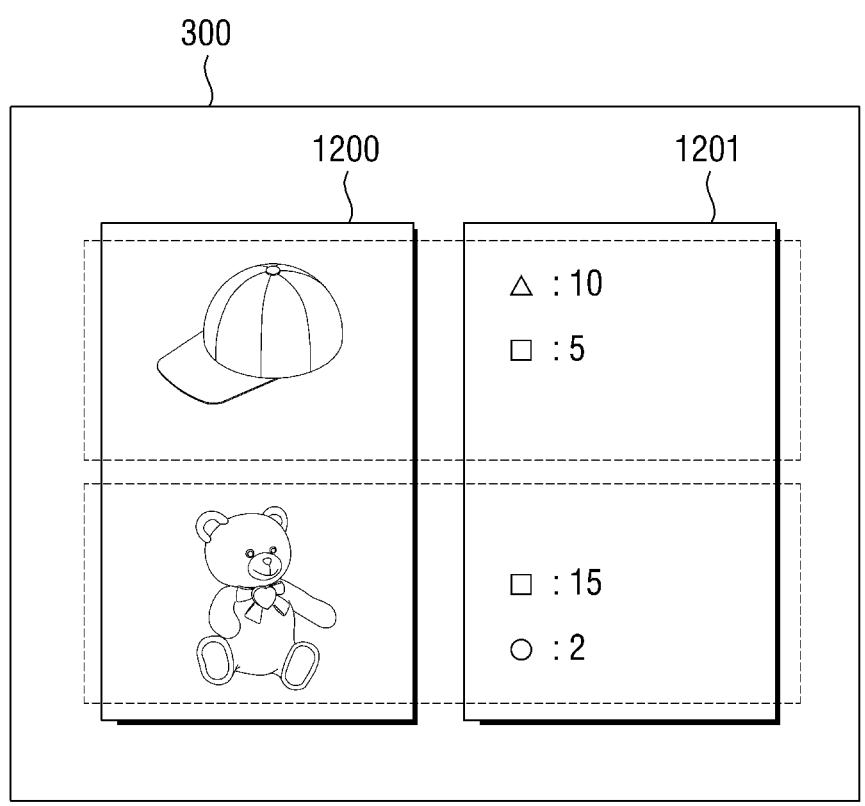
FIG. 12 shows an example of relation between a purchase-target article and the token according to one embodiment of the present invention.

FIG. 12 shows an example of relation between a purchase-target article and the token according to one embodiment of the present invention.

Referring to FIG. 12, the user terminal 300 may provide the user with a purchase-target article list 1200 received from the server 200 and the token information 1201 necessary for purchasing the purchase-target article. Referring to the purchase-target article list 1200 and the token information 1201, it is found that 10 third tokens having a 'Δ' shape and five first tokens having a '□' shape are required to purchase a cap, and 15 first tokens having a '□' shape and two second tokens having a '○' shape are required to purchase a teddy bear.

Similar to the description in FIG. 11, the spirit of the present invention is not limited to the types of UI items and tokens and the number of types shown in the drawing. The number of types of purchase-target articles shown in the drawing, and the types and number of tokens corresponding to the purchase-target articles are provided for illustrative purposes only, which indicates that various purchase-target articles and tokens may exist. Purchase-target articles not shown in the drawing and the token information for purchasing the purchase-target articles may vary. The UI for informing the purchase-target article list 1200 and the token information 1201 corresponding to the purchase-target articles may also be implemented in various forms without being limited to the drawings.

Figure 13:
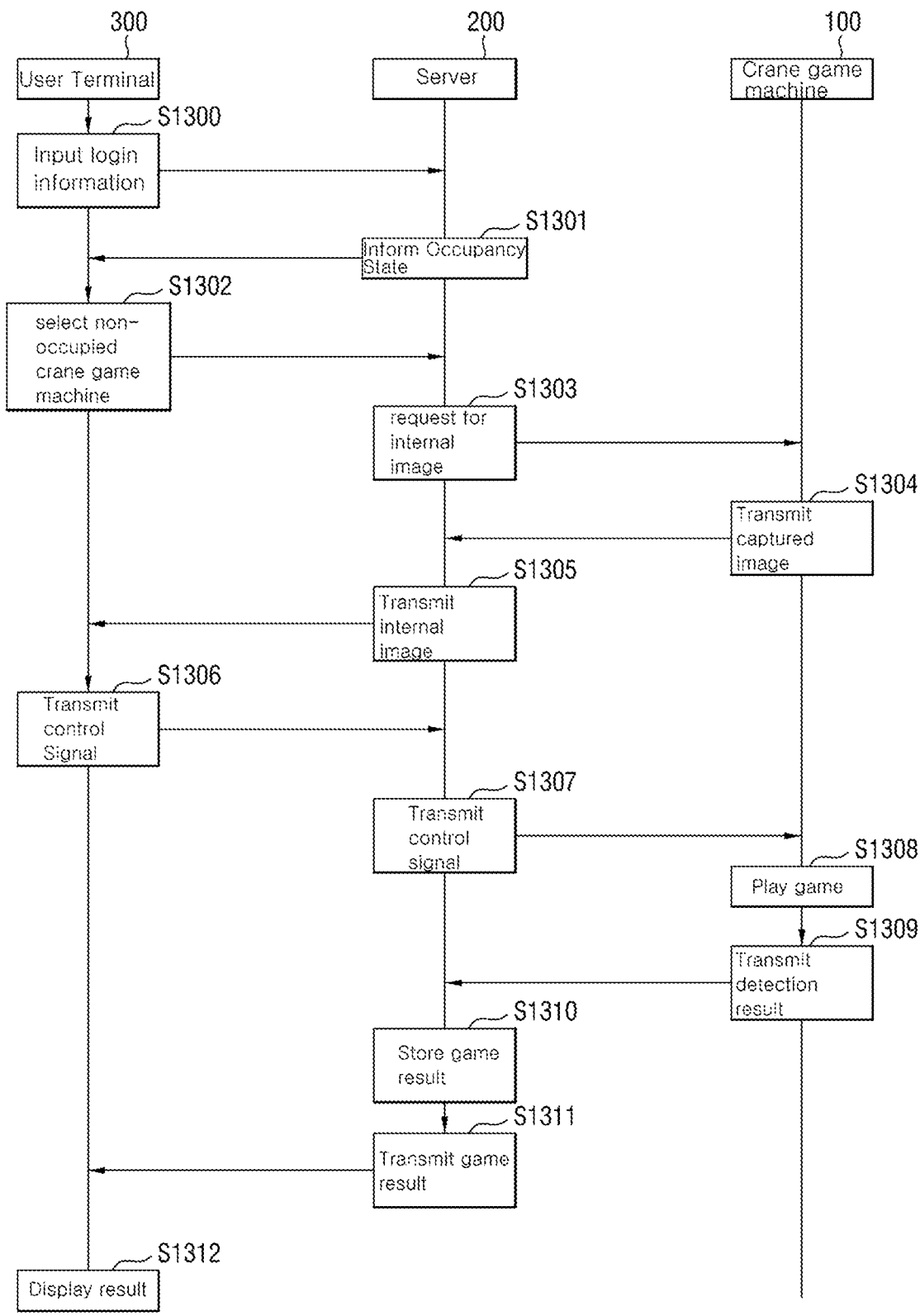
FIG. 13 is a flow chart showing an operation of the crane game system according to one embodiment of the present invention.

FIG. 13 is a flow chart showing an operation of the crane game system according to one embodiment of the present invention.

FIG. 13 shows the system according to one embodiment of the present invention in terms of operations of devices included in the system.

First, in operation S1300, the user terminal 300 may input login information to the server 200. The login information may include information for allowing the server 200 to identify a user attempting to log in, and a password for the login.

When correct login information is received, in operation S1301, the server 200 may transmit information for informing the occupancy state of the crane game machine 100 to the user terminal 300 that transmitted the login information.

The user terminal 300 may display the information indicating the occupancy state received from the server 200. When the user operates the user terminal 300 based on the displayed information to select a non-occupied crane game machine 100, in operation S1302, the user terminal 300 may transmit a signal for selecting the crane game machine 100 to the server 200.

Thereafter, in operation S1303, the server 200 may request the selected crane game machine 100 for the internal image.

When the internal image is requested, in operation S1304, the crane game machine 100 may transmit the image captured by the camera unit 101. In operation S1305, the server 200 may transmit the received internal image 400 to the user terminal 300.

The user may operate the user terminal 300 with reference to the internal image. In operation S1306, the user terminal 300 may transmit a control signal generated based on the operation to the server 200. In operation S1307, the server 200 may transmit the received control signal to the crane game machine 100.

In operation S1308, the crane game machine 100 may perform the game based on the control signal. In more detail, the received control signal may include a prize moving unit control signal for moving the prize moving unit 103, and the prize moving unit 103 may move the prize accommodated in the main body 102 of the crane game machine 100 to the score point based on the prize moving unit control signal. The sensor unit 105 may detect whether the prize passes through the score point. In addition, in operation S1309, the crane game machine 100 may transmit a result detected by the sensor unit 105 to the server 200.

In operation S1310, the server 200 may store the received detection result as a game result. In addition, in operation S1311, the server 200 may transmit the game result to the user terminal 300.

In operation S1312, the user terminal 300 may display the received game result.

Figure 14:
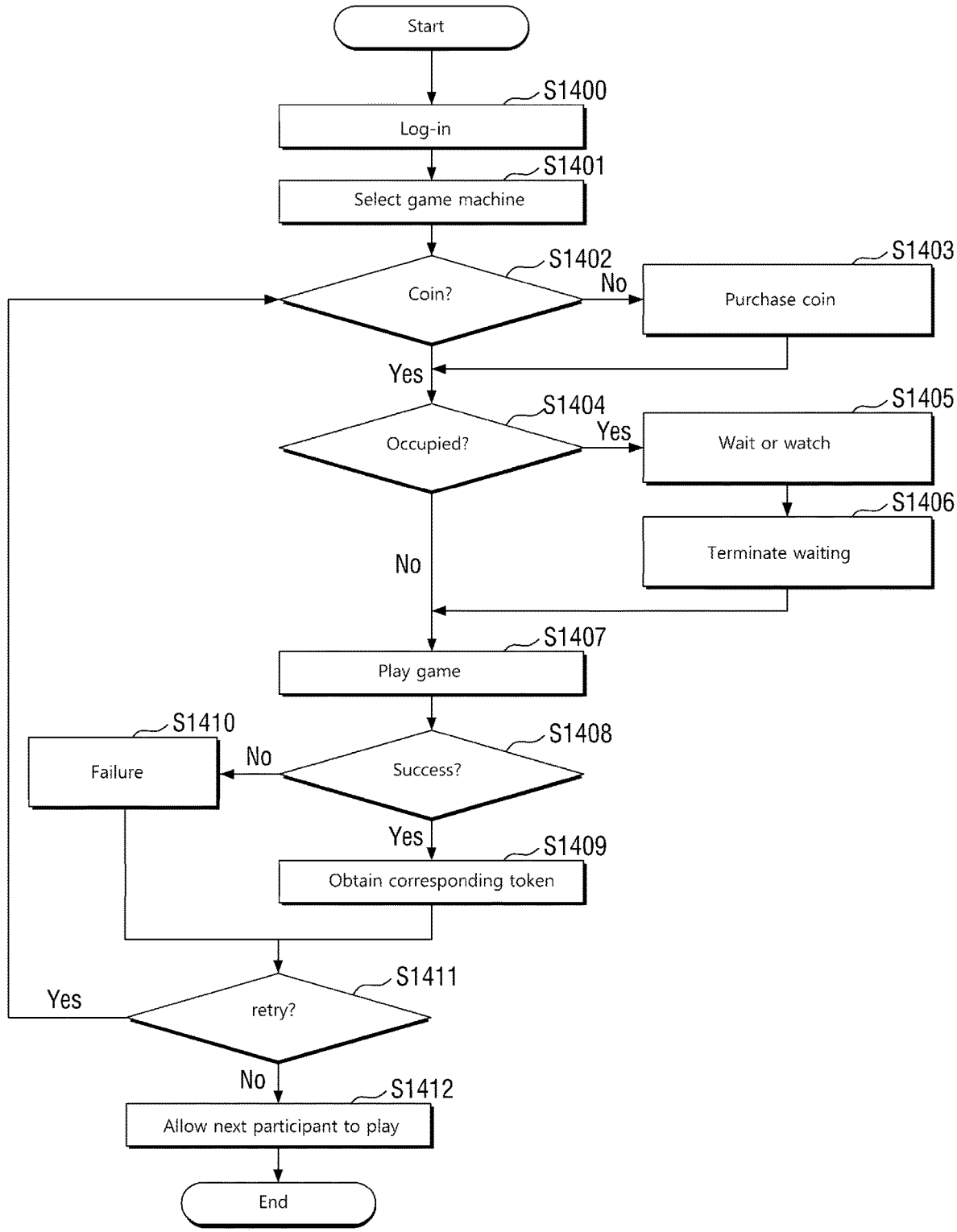
FIG. 14 is a flow chart showing the operation of the crane game system according to one embodiment of the present invention.

FIG. 14 is a flow chart showing the operation of the crane game system according to one embodiment of the present invention.

FIG. 14 shows the system according to one embodiment of the present invention from a point of view of the user.

First, in operation S1400, the user may log in to the server 200. The information for identifying the user and the password may be input through the user terminal 300 to perform the login.

After successfully performing the login, in operation S1401, the user may select the crane game machine 100 with reference to occupancy states of the crane game machines 100, which are provided through the server 200.

In addition, in operation S1402, the server 200 may check whether the user has a coin for playing the game.

When the user has no coins left, in operation S1403, the user may purchase the coin for playing the game. The coin may be purchased through online cash payment. The coin refers to a virtual online currency for playing the game.

When the user has a coin left, or the user has purchased the coin in operation S1403, in operation S1404, the server 200 may check whether the crane game machine 100 selected by the user is occupied by another user.

When the crane game machine 100 selected by the user is occupied, in operation S1405, the user may apply for waiting or watching the game. In addition, the user may select another crane game machine 100, and in this case, the process returns to operation S1401. When the user has applied for watching the game, the server 200 may provide the user with a captured image of the crane game machine 100 in which the game is being played as the internal image. In operation S1406, the game of the occupying user is completed so that the waiting is terminated.

When the waiting is terminated in operation S1406, or the crane game machine 100 selected by the user is not occupied, in operation S1407, the user may operate the user terminal 300 to control the prize moving unit 103 of the crane game machine 100 so as to play the game.

In operation S1408, the sensor unit 105 of the crane game machine 100 may detect whether the prize passes through the score point as the game of the user is being played. The crane game machine 100 may transmit the detection result of the sensor unit 105 to the server 200, and the server 200 may determine whether the game of the user is successful based on the detection result.

When it is detected that the prize has passed through the score point so that the game result is determined to be successful, in operation S1409, the server 200 may store an obtained token corresponding to the crane game machine 100 in which the game is played by the user.

When it is detected that the prize has not passed through the score point, in operation S1410, the server 200 may store that the user has failed the game.

After the game is completed, the server 200 may decrease the coin of the user.

Thereafter, in operation S1411, the server 200 may check whether the user will retry the game based on a signal received from the user terminal 300. When the user retries the game, the process returns to operation S1402 so that the server 200 may check whether the user has any coins left.

When the user does not retry the game, in operation S1412, the server 200 may allow the next waiter or participant to play the game.

In addition, in the operation of the system shown in FIGS. 13 and 14, features of components of the crane game machine 100 and the system described with reference to FIGS. 1 to 12 may be applied in the same or similar manner.

INDUSTRIAL APPLICABILITY

The present invention can be applied to a crane game machine, a crane game system, and a control method of a crane game machine, and more particularly, to a crane game machine, a crane game system, and a control method of a crane game machine, which allow a user to actually operate the crane game machine by using a user terminal through a network to play a game.

The invention claimed is:

1. A crane game machine comprising:
   a main body in which prizes are accommodated;
   a camera unit configured to capture an inside of the main body to generate an internal image;
   a prize moving unit provided at an upper portion of the main body, and configured to pick up a prize and move the prize to a first score point located inside the main body;
   a first prize passing part provided on the first score point and configured to allow the prize to pass through an opening of the first prize passing part;
   a sensor unit positioned inside the first prize passing part and configured to detect passing of the prize through the first score point by detecting whether the prize passes through the opening of the first prize passing part;
   a communication unit configured to transmit the internal image and a detection result of the sensor unit to an external device, and receive a prize moving unit control signal from the external device; and
   a control unit configured to control a movement of the prize moving unit based on the prize moving unit control signal, and control the communication unit to transmit the internal image and the detection result of the sensor unit to the external device,
   wherein the communication unit is configured to transmit the internal image to the external device by applying an adaptive streaming scheme, and the opening of the first prize passing part is positioned inside the main body such that the product passing through the first score point is configured to be received back into the main body.

2. The crane game machine of claim 1, further comprising a second prize passing part provided on a second score point different from the first score point at a lower end of the main body and configured to allow the prize to pass therethrough,
   wherein the prize moving unit moves the prize to the first score point or the second score point based on a separate control signal, and
   the sensor unit is configured to detect whether the prize passes through the first prize passing part or the second prize passing part.

3. The crane game machine of claim 1, wherein the sensor unit is configured to further detect at least one of a type, a shape, a size, and a color of the passing prize.

4. The crane game machine of claim 1, wherein the prize moving unit includes:
   a crane unit configured to pick up and release the prize; and
   a moving unit configured to move the crane unit up, down, left, and right at the upper portion of the main body based on the prize moving unit control signal.

5. The crane game machine of claim 1, wherein the camera unit includes a plurality of cameras configured to capture the inside of the main body from various angles.

6. The crane game machine of claim 5, wherein the control unit controls the communication unit to transmit an image, which is captured by a camera selected among the cameras based on a camera unit control command received through the communication unit, to the external device as the internal image.

7. The crane game machine of claim 1, further comprising a prize circulation unit configured to circulate the prizes accommodated in the main body.

8. The crane game machine of claim 7, wherein the prize circulation unit is provided at a lower end of the main body, and includes a roller configured to stir the prizes.

9. A crane game system including a plurality of crane game machines and a server, wherein each of the crane game machines includes:
   a main body in which prizes are accommodated;
   a camera unit configured to capture an inside of the main body to generate an internal image;
   a prize moving unit provided at an upper portion of the main body, and configured to pick up a prize and move the prize to a score point located inside the main body;
   a prize passing part provided on the score point and configured to allow the prize to pass through an opening of the prize passing part;
   a sensor unit positioned inside the prize passing part and configured to detect passing of the prize through the score point by detecting whether the prize passes through the opening of the prize passing part;
   a first communication unit configured to transmit the internal image and a detection result of the sensor unit to an external device, and receive a prize moving unit control signal from the external device; and
   a first control unit configured to control a movement of the prize moving unit based on the prize moving unit control signal, and control the first communication unit to transmit the internal image and the detection result of the sensor unit to the external device, and
   the server includes:
   a second communication unit configured to transmit the prize moving unit control signal received from a user terminal to a first crane game machine selected by a user among the crane game machines, and transmit the internal image and token information of the user received from the first crane game machine to the user terminal;
   a token management unit configured to store the token information of the user; and
   a second control unit configured to store the token information of the user, which is generated based on the detection result of the sensor unit received from the first crane game machine, in the token management unit,
   wherein the communication unit is configured to transmit the internal image to the external device by applying an adaptive streaming scheme, and the opening of the prize passing part is positioned inside the main body such that the product passing through the score point is configured to be received back into the main body.

10. The crane game system of claim 9, wherein the camera unit includes a plurality of cameras configured to capture an inside of each of the crane game machines from various angles, and
    the first control unit controls the first communication unit to transmit an image, which is captured by a camera selected among the cameras based on a camera unit control command received through the first communication unit, to the server as the internal image.

11. The crane game system of claim 9, wherein the control unit transmits an occupancy state of each of the crane game machines according to an occupancy state identification request received from the user terminal.

12. The crane game system of claim 9, wherein the token information includes a first token generated when a first prize of the first crane game machine passes through a score point located inside a main body of the first crane game machine, and a second token generated when a second prize of a second crane game machine passes through a score point located inside a main body of the second crane game machine.

13. A method of controlling a crane game machine, the method comprising:
- capturing an inside of a main body to generate an internal image;
- transmitting the generated internal image to an external device by applying an adaptive streaming scheme;
- receiving a prize moving unit control signal from the external device;
- picking up, by a prize moving unit, a prize accommodated in the main body and moving the prize to a prize passing part provided on a score point based on the prize moving unit control signal;
- passing the prize through an opening of the prize passing part;
- detecting, by a sensor unit positioned inside the prize passing part, whether the prize passes through the score point by detecting whether the prize passes through the opening of the prize passing part, and transmitting a detection result to the external device,
- wherein the opening of the prize passing part is positioned inside the main body such that the product passing through the score point is received back into the main body.

* * * * *